(12) United States Patent
Ortega De Miguel et al.

(10) Patent No.: US 7,954,764 B2
(45) Date of Patent: Jun. 7, 2011

(54) SMART BOOM TIP ASSEMBLY

(75) Inventors: Mariano Ortega De Miguel, Madrid (ES); Antonio San Jose Orche, Madrid (ES)

(73) Assignee: Eads Construcciones Aeronauticas, S.A., Madrid (ES)

( * ) Notice: Subject to any disclaimer, the term of this patent is extended or adjusted under 35 U.S.C. 154(b) by 1081 days.

(21) Appl. No.: 11/542,631

(22) Filed: Oct. 3, 2006

(65) Prior Publication Data
US 2010/0327116 A1    Dec. 30, 2010

(30) Foreign Application Priority Data
Aug. 29, 2006    (EP) .................................... 06381034

(51) Int. Cl.
*B64D 39/06*    (2006.01)
(52) U.S. Cl. .................................................. 244/135 A
(58) Field of Classification Search ............... 244/135 A, 244/136, 172.4; 141/387
See application file for complete search history.

(56) References Cited

U.S. PATENT DOCUMENTS

| | | | | |
|---|---|---|---|---|
| 2,663,523 A * | 12/1953 | Leisy | .......................... | 244/135 A |
| 3,817,560 A * | 6/1974 | Guertin | ........................... | 285/90 |
| 4,150,803 A * | 4/1979 | Fernandez | ................. | 244/135 A |
| 4,408,943 A * | 10/1983 | McTamaney et al. | .... | 244/135 A |
| 4,998,560 A * | 3/1991 | Le Devehat | .................... | 141/387 |
| 5,785,276 A * | 7/1998 | Ruzicka | .................... | 244/135 A |
| 6,651,933 B1 * | 11/2003 | von Thal et al. | .............. | 244/136 |
| 7,021,586 B2 * | 4/2006 | Bolling | ...................... | 244/135 A |
| 7,281,687 B2 * | 10/2007 | Schroeder | ................. | 244/135 A |

* cited by examiner

*Primary Examiner* — Galen Barefoot
(74) *Attorney, Agent, or Firm* — Ladas & Parry LLP

(57) ABSTRACT

A refueling apparatus for interconnecting a tanker aircraft (11) with a receiver aircraft in flight comprising a boom (21) joined to said tanker aircraft (11) by means of a mechanical articulation (41) having control means including a central computer station, an inner fuel conduit, a refueling nozzle (27) at its distal end and, and a smart tip assembly comprising a first module (83) having load sensing means, a second module (85) having load alleviation means and a third module (87), joined to the nozzle (27), having a mechanical fuse (99) for allowing the safe separation of tanker and receiver aircraft in the event of overloads. The invention also comprises a method of load alleviation for minimizing the loads on the boom (21).

7 Claims, 2 Drawing Sheets

SMART BOOM TIP ASSEMBLY

FIELD OF THE INVENTION

The present invention relates generally to aircraft refueling booms and more specifically to a boom having a boom tip assembly that provides a load attenuation, limitation and alleviation during tanker/receiver contact and connection.

BACKGROUND

An aircraft refueling boom is a beam fuel-tight unit attached to its forward end to a tanker aircraft having aerodynamic lift surfaces called ruddevators used to aerodynamically control the position of the boom in elevation and azimuth that provides a fuel passage from the tanker to the boom nozzle.

The outer end portion of the boom is a telescoping section for inward and outward movement.

The receiver aircraft is equipped with an aerial refueling receptacle which engages with the boom nozzle for the refueling operation.

The boom operator located in the tanker aircraft guides the boom so as to line the boom nozzle with the receiver aircraft receptacle. When the boom nozzle is aligned with the receiver receptacle the boom operator extends the telescoping portion, so that the nozzle engages the receptacle to complete the coupling which must be accomplished and maintained within a predetermined refueling envelope to avoid a disconnection.

During tanker to receiver contacts, mechanical contact loads are build up and stresses are placed on the boom as well as on the receiver. These stresses can result in boom or receptacle failure.

A boom passive contact loads attenuation mechanism based on a recoil shock absorber on a boom in use is known. One disadvantage of this device is that it is not properly integrated in the boom.

Once the refueling boom is connected to the receiver aircraft, known contact detection systems are based on coil signals installed on the nozzle. One disadvantage of this passive coil signals are the maintenance needs of the coil equipment. Another disadvantage is the potential for damage to the coil since the refueling boom adjacent to the coil installation commonly contacts the receiver aircraft.

Known refueling booms do not provide for automatic boom load alleviation when the refueling boom is connected to the receiver aircraft. Stresses are placed on a boom due to the motion of the tanker as well as from the receiver that can result in boom failure. In these systems it is the responsibility of the boom operator to avoid boom deflections.

A boom load alleviation system employing strain gauges is known. This load alleviation system relies on electrical feedback from the strain gauges to a computer onboard the aircraft which identifies a boom bending load. One disadvantage of this strain gauge type load alleviation system is the routing of the analog signals from the boom tip to the aircraft on board computer as well as the integrity of the raw signals.

The present invention is intended to solve said disadvantages.

SUMMARY OF THE INVENTION

In a first aspect, the present invention provides a refueling apparatus for interconnecting a tanker aircraft with a receiver aircraft in flight comprising a boom, joined to said tanker aircraft by means of a mechanical articulation, with an inner fuel conduit and a refueling nozzle at its distal end, having control means including a central computer station, being its tip region arranged by the assembly of a first module having load sensing means, a second module having load alleviation means and a third module, joined to the nozzle, having a mechanical fuse for allowing the safe separation of tanker and receiver aircraft in the event of overloads.

Said first module also comprises means for converting the signals provided by said load sensing means into digital signals.

The apparatus also comprises digital communication means between said first module and said central computer station.

In a second aspect, the present invention provides a method of load alleviation in said refueling apparatus comprising the steps of:
 a) Acquiring load signals from load sensing means.
 b) Converting said load signals in digital signals.
 c) Processing said digital signals for obtaining and sending control signals to the ruddevator actuators for moving the ruddevators in order to minimize the loads on the boom.

One advantage of this invention in that the modular assembly of the boom tip region provides a safer, more maintainable, and more durable refueling apparatus.

Another advantage of this invention is that it provides a refueling apparatus with independent means for the detection of the contact with the receiver.

Another advantage of this invention is that includes means for a high integrity load data consolidation to improve the safety and reliability of the load alleviation function.

BRIEF DESCRIPTION OF DRAWINGS

The foregoing objects and many of the attendant advantages of this invention will become more readily appreciated as the same becomes better understood by reference to the following detailed description when taken in conjunction with the accompanying drawings, wherein.

DETAILED DESCRIPTION OF THE INVENTION

Figure 1:
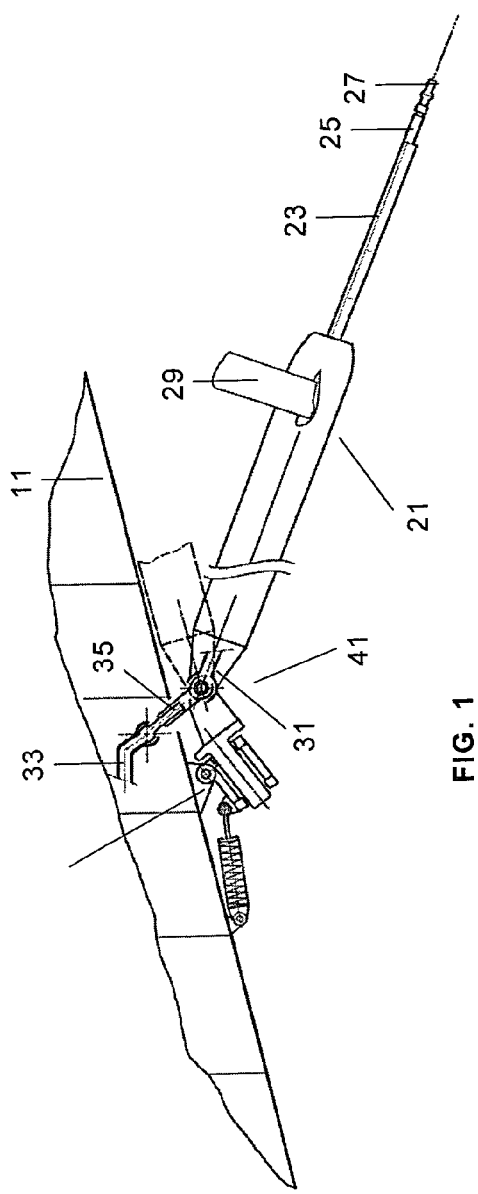
FIG. 1 shows a side view of a refueling boom according to the invention.
Figure 2:
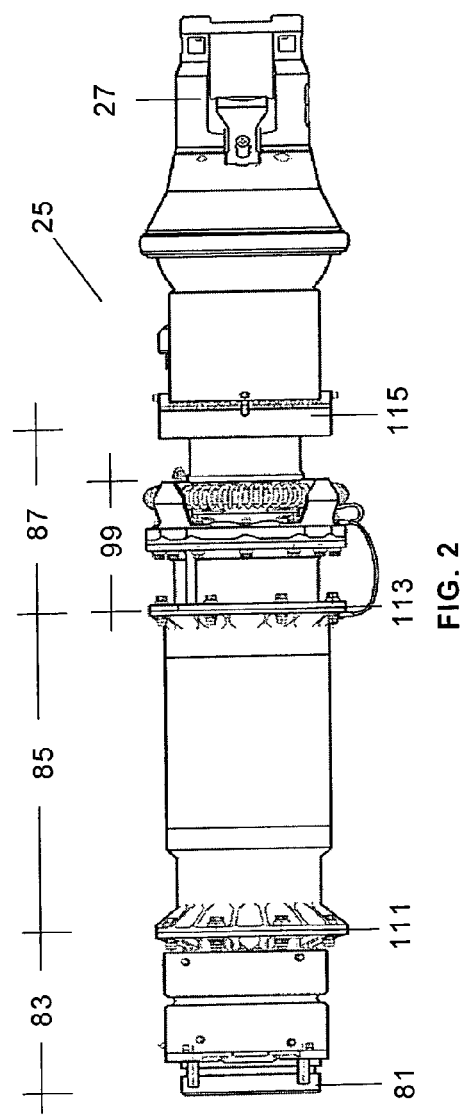
FIG. 2 shows a side view of the boom tip assembly according to the invention.
Figure 3:
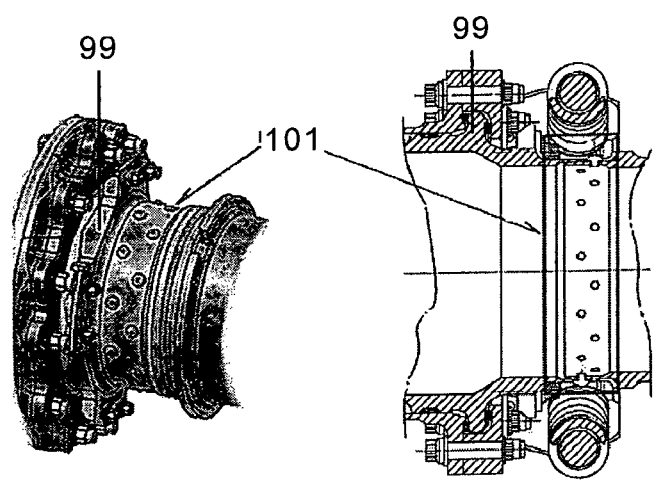
FIG. 3 show detailed views of the mechanical fuse included in the boom tip assembly according to the invention.
Figure 4:
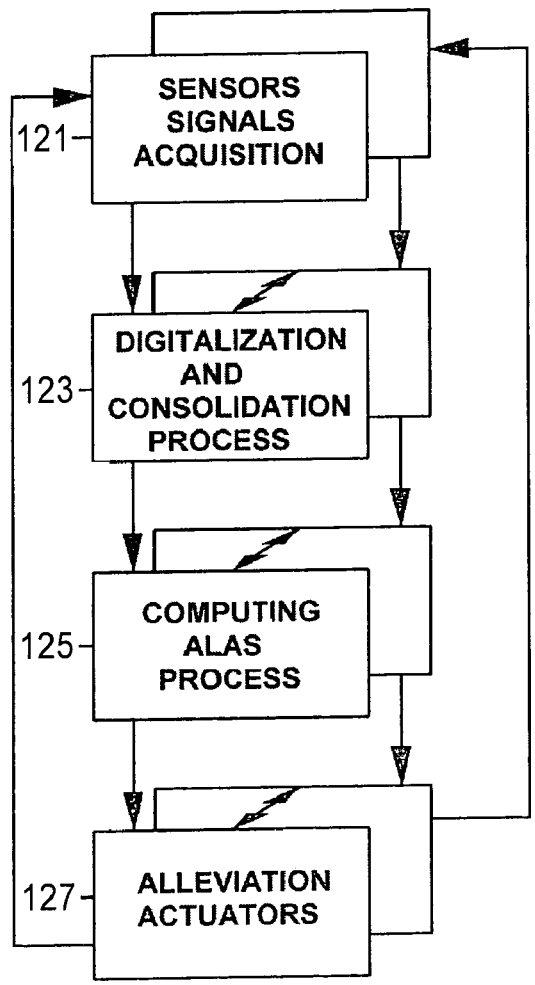
FIG. 4 shows a flow chart of a load alleviation method according to the invention.

An aircraft refueling boom 21 is a telescoping beam fuel-tight unit attached to its forward end to the underside fuselage tail of an aircraft 11 by means of a mechanical articulation 41. Integrally attached to the boom 21 are aerodynamic lift surfaces 29 called ruddevators which are used to aerodynamically control the position of the boom 21 in elevation and azimuth.

The outer end portion 23 of the boom 21 is a telescoping section for inward and outward movement. Located on the distal end of the telescoping tube 23 is a boom tip assembly 25 and a nozzle 27. The receiver aircraft, not shown, is equipped with an aerial refueling receptacle which engages with the nozzle 27 for the refueling operation.

In order to satisfy the refueling space envelope requirements (with respect to the tanker aircraft reference axes), the boom 21 incorporates at is union with the tanker aircraft 11 a mechanical articulation 41 that provides it with two degrees of freedom and, in particular, a conical pivoting angular motion of the boom towards its pitch and roll axes as it will be explained in more detail below.

The boom 21 is orientated towards the refueling space envelope via two ruddevators 29 (each one tied to the boom main structural tube tip via a rotary hinge) in a 'V' tail type configuration. The aerodynamically control forces to aim the boom arises by changing the incidence angle of the ruddevators with respect the free air stream. The relative positioning of each ruddevator incidence angle is achieved by an operator located in the tanker aircraft that can exercise remote control of the refueling operation via dedicated devices allocated on a control console.

The telescoped beam 23 provides fuel passage from a fixed fuel line 31, connected to the tanker aircraft line 33 by means of a coupling 35 integrated with the mechanical articulation 41, to the nozzle 27.

The boom operator, not shown, located in the tanker aircraft 11, guides the boom 21 so as to line the boom nozzle 27 with the receiver aircraft receptacle. When the boom nozzle 27 is dynamically aligned with the receiver receptacle the boom operator extends the telescoping portion 23, so that the nozzle 27 engages the receptacle to complete the coupling which must be accomplished and maintained within a predetermined refueling envelope to avoid a disconnection.

Loads during engagement and contact are transferred from the nozzle 27 to the boom 21 through a smart boom tip device 25 which attenuates, alleviates and limits such loads while maintaining a fuel tight passage through the boom 21 to the nozzle 27.

The smart boom tip device 25 is attached to the boom 21 through a fuel tight flange 81. The forward most section of the smart boom tip device 25 consists of a loads sensing and concentrating device 83.

Said device 83 includes pressure, flexion, torsion, compression and extension load sensing means as well as digitalization, consolidation, concentration and transmission means to send digital signals representing the information obtained by said sensing means to the boom control station (not shown).

In a preferred embodiment said sensing devices include strain gauge bridges.

In another preferred embodiment said sensing device include piezo-electric stress sensors.

In a preferred embodiment the digitalization, consolidation and concentration of load measurements obtained by said sensing means into a high integrity digital signal is based in the use of dual redundant microprocessors or micro computers and the usage of a dual redundant set of CAN, or a MIL 1553 or an ARINC 429 digital buses. Said high integrity load data are digitally transmitted to the boom control station where it is processed as explained in detail later.

The middle section 85 of the smart boom tip 25 comprises fuel tight telescoping and swivel tubes and a set of shock absorbers that attenuates peak contact loads during tanker to receiver connection. The telescoping and swivel tubes accommodates for longitudinal and torsion degrees of freedom during contacts and to recover the original position after nozzle to receptacle disconnection.

In one preferred embodiment of the invention, the shock absorbers utilize a mechanical elastic element like a set of friction springs. In another preferred embodiment the shock absorbers utilize a fluid or pneumatic energy dissipation device.

The aft most section 87 of the smart boom tip device comprises a fuel tight tube which structure is calibrated as a mechanical fuse 99 that limits the longitudinal and radial forces, as well as flexion moments and protects the boom structure in a controlled fashion in the event of overloads assuring the safe separation of tanker and receiver aircraft.

In one preferred embodiment of the present invention the mechanical fuse 99 utilizes at least one set of calibrated rivets 101 and at least one set of conveniently located weak links.

The three main sections 83, 85 and 87 of the smart boom tip device are joined together through fuel tight flanged connections 111, 113 The smart boom tip. device in turn is joined to the nozzle 27 through a fuel tight flanged connection 115.

The refueling boom according to this invention allows a method of boom load alleviation comprising the following operational steps:

In step 121 sensor signals are acquired.
In step 123 sensor signals are converted into digital signals.
In step 125 a computing process is performed to:
Identify that the contact with the receiver aircraft is made, comparing the load levels with reference values stored in a computer memory.
Calculate a control signal for repositioning the ruddevators in order to minimize the loads on the boom.
In step 127 said control signal is forwarded to the ruddevators actuators. In one preferred embodiment, an electromechanical actuator is used to reposition the flight control surfaces. In another preferred embodiment hydraulic control valves are used.

The strain gauge signals are analyzed by the computer which provides automatic control to re-steer the boom back to a lower load position.

Although the present invention has been fully described in connection with preferred embodiments, it is evident that modifications may be introduced within the scope thereof, not considering this as limited by these embodiments, but by the contents of the following claims.

The invention claimed is:

1. A refueling apparatus for interconnecting a tanker aircraft with a receiver aircraft in flight comprising a boom joined to said tanker aircraft by means of a mechanical articulation, said boom having an inner fuel conduit, a refueling nozzle at its distal end, and control means including a central computer station, wherein said boom comprises at its tip region a first module having load sensing means, a second module having load alleviation means, and a third module, joined to the nozzle, having a mechanical fuse for allowing a safe separation of said tanker aircraft and said receiver aircraft in the event of overloads.

2. The refueling apparatus according to claim 1, wherein said first module further comprises means for converting signals provided by said load sensing means into digital signals.

3. The refueling apparatus according to claim 2 wherein said load sensing means include strain gauge bridges.

4. The refueling apparatus according to claim 2, wherein said load sensing means include piezo-electrical sensors.

5. The refueling apparatus according to claim 2 further comprising digital communication means between said first module and said central computer station.

6. The refueling apparatus according to claim 5, wherein said communication means include at least one of a CAN, MIL 1553, and an ARINC 429 digital buses.

7. A method of load alleviation in a refueling apparatus for interconnecting a tanker aircraft with a receiver aircraft in flight comprising a boom, joined to said tanker aircraft by means of a mechanical articulation, said boom (21) including at its tip region a first module having load sensing means, a second module having load alleviation means, a third module, joined to the nozzle, having a mechanical fuse for allowing a safe separation of said tanker aircraft and said receiver aircraft in the event of overloads, and control means including a central computer station, comprising the steps of:
acquiring load signals from said load sensing means;
converting the load signals into digital signals; and
processing the digital signals for obtaining and sending control signals to the ruddevator actuators for moving the ruddevators in order to minimize the loads on the boom.

* * * * *